(12) United States Patent
Sbongk

(10) Patent No.: US 9,303,673 B2
(45) Date of Patent: Apr. 5, 2016

(54) FASTENING DEVICE

(71) Applicant: ILLINOIS TOOL WORKS INC., Glenview, IL (US)

(72) Inventor: Albert Sbongk, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 120 days.

(21) Appl. No.: 14/360,949

(22) PCT Filed: Nov. 30, 2012

(86) PCT No.: PCT/US2012/067284
§ 371 (c)(1),
(2) Date: May 28, 2014

(87) PCT Pub. No.: WO2013/082421
PCT Pub. Date: Jun. 6, 2013

(65) Prior Publication Data
US 2015/0117981 A1   Apr. 30, 2015

(30) Foreign Application Priority Data
Dec. 1, 2011   (DE) .......................... 10 2011 119 819

(51) Int. Cl.
*F16B 13/04* (2006.01)
*F16B 19/10* (2006.01)
*F16B 13/00* (2006.01)

(52) U.S. Cl.
CPC .......... *F16B 19/1045* (2013.01); *F16B 19/1054* (2013.01); *F16B 19/1072* (2013.01); *F16B 19/1081* (2013.01); *F16B 2013/006* (2013.01)

(58) Field of Classification Search
CPC ...... F16B 13/04; F16B 19/10; F16B 19/1045; F16B 19/1054; F16B 19/1072; F16B 19/1081; F16B 2013/006
USPC ........................... 411/39, 40, 43, 45, 55, 60.2
See application file for complete search history.

(56) References Cited

U.S. PATENT DOCUMENTS 2,882,780 A * 4/1959 Edwards ............. F16B 19/1081
411/337
3,178,989 A * 4/1965 Siebol .................... B21J 15/045
411/38

(Continued)

FOREIGN PATENT DOCUMENTS

DE          2754910 A1   6/1979
DE   102010055808 A1    6/2012

(Continued)

OTHER PUBLICATIONS

ISR and WO for PCT/US2012/067284 mailed Jan. 25, 2013.

*Primary Examiner* — Roberta Delisle
(74) *Attorney, Agent, or Firm* — Hauptman Ham, LLP

(57) ABSTRACT

The invention relates to a device for fastening at least a first component having a through-opening on at least a second component also having a through-opening, comprising a fastening bushing with a sleeve section which is designed to be inserted through the through-openings of the components and with a sleeve head, wherein the sleeve section comprises at least one locking section and at least two recesses extending in an axial direction in its wall, and wherein the sleeve head comprises a through-opening aligned with the sleeve section, a fastening pin with a pin section and with a pin head, wherein the pin head comprises at least one locking section and wherein stop means are provided between the fastening pin and the fastening bushing, wherein the pin section is inserted through the sleeve section and the through-opening of the sleeve head until reaching the stop provided by the stop means, wherein the pin head engages with the free end of the sleeve section being opposite to the sleeve head, and a watertight sheath, which surrounds the sleeve section and the pin head engaging the sleeve section, wherein the fastening pin is designed to be pulled further through the through-opening of the sleeve head until the locking section of the pin head locks with the locking section of the sleeve section, and wherein the walls of the sleeve section and the sheath spread, whereby the sleeve section and the sheath reduce in length.

14 Claims, 2 Drawing Sheets

(56) References Cited

U.S. PATENT DOCUMENTS

Figure 1:
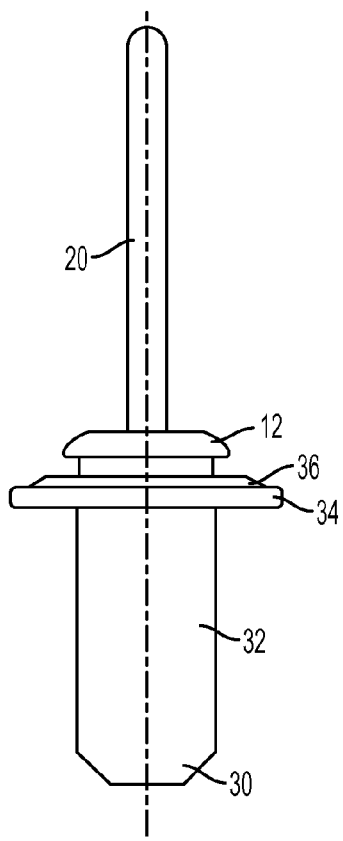

| | | | | |
|---|---|---|---|---|
| 3,300,798 A | * | 1/1967 | York | B21K 1/60 29/509 |
| 3,345,901 A | * | 10/1967 | Brosseit | F16B 19/1054 29/509 |
| 3,463,046 A | * | 8/1969 | Wendt | B21J 15/043 29/510 |
| 3,916,970 A | * | 11/1975 | Owens | B60C 15/0226 152/379.4 |
| 4,293,258 A | * | 10/1981 | McKewan | F16B 19/083 411/30 |
| 4,490,083 A | * | 12/1984 | Rebish | F16B 5/02 411/338 |
| 4,647,264 A | * | 3/1987 | Pamer | F16B 19/1027 24/94 |
| 4,826,378 A | * | 5/1989 | Pamer | F16B 19/04 24/94 |
| 4,840,522 A | * | 6/1989 | Kurihara | F16B 19/1081 411/44 |
| 5,248,231 A | * | 9/1993 | Denham | F16B 19/1054 411/38 |
| 5,345,734 A | * | 9/1994 | Tremblay | E06B 3/6775 411/43 |
| 5,569,005 A | * | 10/1996 | Millington | F16B 19/1072 411/34 |
| 5,645,383 A | * | 7/1997 | Williams | F16B 19/1054 411/38 |
| 5,759,001 A | * | 6/1998 | Smith | F16B 19/1054 411/34 |
| 6,854,940 B2 | * | 2/2005 | Jennings | F16B 19/1054 411/38 |
| 7,887,273 B2 | * | 2/2011 | Vigliotti | F16B 19/1045 411/38 |
| 2011/0076114 A1 | | 3/2011 | Sano et al. | |

FOREIGN PATENT DOCUMENTS

| | | |
|---|---|---|
| EP | 2302231 A1 | 3/2011 |
| FR | 2825762 A1 | 12/2002 |
| GB | 594859 A | 11/1947 |
| GB | 2157788 A | 10/1985 |
| JP | 57-110313 U | 7/1982 |
| JP | H0280209 U | 6/1990 |
| JP | H0712613 U | 3/1995 |
| JP | 08-042534 A | 2/1996 |
| JP | H1137118 A | 2/1999 |

\* cited by examiner

FASTENING DEVICE

RELATED APPLICATIONS

The present application is a National Phase of International Application Number PCT/US2012/067284 filed Nov. 30, 2012, and claims priority to German Application Number 10 2011 119 819.2 filed Dec. 1, 2011.

The invention relates to a device for fastening at least a first component having a through-opening on at least a second component also having a through-opening. Planar components such as cladding members are fastened to each other with such devices in the field of automotive construction. A device of this type is known from the German patent application which has the file reference 10 2010 055 808 and which is older but was not previously published. This device readily allows the components to be fastened to each other and, at the same time, to be disassembled without being destroyed. Sometimes, however, there is the desire to prevent the passage of water through the through-openings of the components.

Proceeding from the prior art mentioned, therefore, the object of the invention is to provide a device of the type mentioned in the introduction which ensures sealing with respect to the passage of water while permitting simple assembly and high retention forces during operation.

This object is achieved by the subject matter of claim 1. Advantageous embodiments are set forth in the dependent claims, the description and the figures.

The invention achieves the object by a device for fastening at least a first component having a through-opening on at least a second component also having a through-opening, comprising a fastening bushing with a sleeve section which is designed to be inserted through the through-openings of the components and with a sleeve head, wherein the sleeve section comprises at least one locking section and at least two recesses extending in an axial direction in its wall, and wherein the sleeve head comprises a through-opening aligned with the sleeve section, a fastening pin with a pin section and with a pin head, wherein the pin head comprises at least one locking section, and wherein stop means are provided between the fastening pin and the fastening bushing, wherein the pin section is inserted through the sleeve section and the through-opening of the sleeve head until reaching the stop provided by the stop means, wherein the pin head engages with the free end of the sleeve section being opposite to the sleeve head, and a water-tight sheath, which surrounds the sleeve section and the pin head engaging the sleeve section, wherein the fastening pin is designed to be pulled further through the through-opening of the sleeve head until the locking section of the pin head locks with the locking section of the sleeve section, and wherein the walls of the sleeve section and the sheath spread, whereby the sleeve section and the sheath reduce in length.

The components to be fastened with the device according to the invention may be in particular planar components of a car. For example, the components may be cladding members. It is also possible to connect together more than two components with the fastening device according to the invention. In principle, the fastening device has the function of a rivet. The sleeve section may particularly have a substantially cylindrical wall which delimits a cylindrical sleeve opening. The cylindrical wall may be perforated by at least two, preferably more than two, axial recesses. They allow the sleeve section to be spread with the length being reduced at the same time. The sleeve head has a widened cross-section in relation to the sleeve section which extends therefrom, such that the sleeve head abuts one of the components directly or indirectly when the sleeve section is introduced completely through the components. Accordingly, the pin head also has, at least in the region of its locking section, a cross-section which is widened with respect to the pin section extending from it. The pin section and/or the pin head may be of a cylindrical shape.

According to the invention, a water-tight sheath or sleeve surrounds the sleeve section and the pin head engaged with the sleeve section. The sheath ensures tightness of the fastening device and therefore of the through-openings of the components against the passage of water. It is possible for the fastening pin and the fastening bushing already to be introduced one in the other until the stop is reached, before the assembly on the components and in particular before the components are inserted in the through-openings, and consequently to be pre-assembled. The sheath can also already be mounted on the sleeve section before the device is inserted into the through-openings of the components. It is also possible first to introduce the fastening bushing through the through-openings of the components and only subsequently to insert the fastening pin into the fastening bushing. The sheath is then also fastened on the sleeve section only after the fastening pin has been introduced. In both cases, the pin section is drawn through the fastening bushing for assembly by means of a suitable tool, which may further be part of the device according to the invention, until the locking sections engage with each other. The pin section and the pin head are first introduced as far as the stop and in particular without deformation of the sleeve section therein. When the pin section is further drawn through the sleeve section and the sleeve head, there is then a deformation of the sleeve section, in particular a spreading action, brought about by the force transferred in the region of the stop. The wall of the sleeve section becomes spread, enabled by the axial recesses, and the sleeve section is substantially reduced in terms of its length. There is also produced a spreading action and reduction in length of the sheath which is positioned on the sleeve section. The spreading of the sleeve section also directly brings about the spreading of the sheath. The sheath is constructed in such a manner that, although it is subjected to a substantial expansion in the course of this spreading action, it remains closed in order to ensure the water-tightness. In contrast to the sleeve section, in which the spreading action is ensured by the axial recesses, this is brought about in the sheath by selection of a suitable elastic material. The length of the sleeve section and of the sheath is reduced in the course of the assembly in particular to a fraction of the original length. The structural space of the device is thereby reduced in the assembled state.

In the fully assembled state, there is produced the locking engagement between the locking sections and therefore a secure fastening of the fastening bushing and fastening pin on the components, which are thereby securely connected to each other. The assembly can therefore be carried out particularly without a relative rotational movement between the fastening pin and fastening bushing. At the same time, the spreading action of the sleeve section and of the sheath results in the device not being able to be pulled back out of the through-openings of the components. Particularly simple assembly is thus achieved, at the same time with great retention forces during operation.

The fastening pin and/or the fastening bushing may each be constructed integrally. Furthermore, the fastening pin and/or the fastening bushing may be made from a plastic, produced, for example, using a plastics injection molding method. In principle, however, it is also possible for the fastening pin and/or the fastening bushing to comprise a metal material.

As already mentioned, the sheath is expanded when the sleeve section is spread. In typical industrial processes, the fastening pin is drawn through the fastening bushing with tools which allow a very rapid assembly, often in only a few tenths of a second. This results in very high deformation speeds. Expansion speeds of up to 7 m per minute may occur. In accordance with the dimensional configuration of the device, even higher expansion speeds may occur. The sheath must be selected with regard to material and dimensions such that it does not tear open, and such that the sheath does not have an excessively high resistance to the expansion occurring in the course of the spreading. If a material having a low level of creep behavior is selected for the sheath, a permanent penetration resistance is ensured. According to the invention, therefore, water-tightness is achieved during operation together with simple assembly and great retention forces. Devices of the type according to the invention may be used in particular in components in which welding of threaded bolts cannot be considered. This is the case, for example, with carbon fiber components.

According to one embodiment, the sheath may comprise a cylindrical section being open on one side and surrounding the sleeve section and the pin head engaging the sleeve section, and a flange formed in the area of the opening of the cylindrical section. The flange has a central through-opening. A cylindrical section whose receiving opening is aligned with the through-opening of the flange extends from the flange. However, the end of the cylindrical section facing away from the flange is closed. Therefore, the sheath is completely closed and water-tight except for the opening of the flange. The sheath is then fitted onto the sleeve section and the pin head which is engaged therewith. The cylindrical section is spread open and expanded in the course of the fastening action.

According to another embodiment, the flange may be held on the sleeve head, for example by means of a locking connection.

According to another embodiment, the flange may be sealingly clamped between the sleeve head and the surface of the first component when the device is in the state fastened on the components. Furthermore, the spread cylindrical section of the sheath can sealingly abut the surface of the second component when the device is in this state fastened on the components. In this regard, the fastened state indicates the state of the device introduced through the component openings when the sleeve section is spread and the sheath is spread, that is to say when the locking sections of the pin head and of the sleeve section are engaged with each other. In the above-mentioned embodiments, the flange and the spread sleeve section consequently abut the surfaces of the two components facing away from each other. Therefore, the components are tightly clamped between the flange and the spread sleeve section. In particular, the flange and the spread sleeve section have a greater cross-section, particularly a greater diameter, than the through-openings of the components. Passage of water through the device according to the invention or the through-openings of the components is thereby reliably prevented. The sleeve section and the sheath may become substantially increased in terms of their cross-section in the course of the spreading. For instance, they may be subjected to a cross-sectional enlargement of over 100%, in particular of over 150%, of their cross-section before the spreading. The cross-sectional enlargement, in particular the radial or transverse expansion, of the sheath and optionally also of the sleeve section in the course of the spreading may be proportional to its reduction in length.

The sheath may be integrally formed. It may comprise, for example, a thermoplastic elastomer, in particular a vulcanized thermoplastic elastomer. Such elastomers readily allow production by means of a plastics injection molding method and at the same time provide adequate expansibility for the use according to the invention.

According to another embodiment, at least one of the locking sections may be provided as a thread and engagement means may be provided, with which the pin head can be screwed out of the sleeve section for disassembly. In this embodiment, it is possible to disassemble the device and therefore the mutually connected components without destroying them. It is possible to reliably prevent damage to the fastening device or the components.

According to another embodiment, the engagement means can be provided on the pin head and/or on the pin section. The engagement means can be arranged on the outer side in the assembled state of the device or on the inner side of the device in the assembled state. This may be selected in accordance with the accessibility in the assembled state. The engagement means may comprise, for example, an inner or outer hexagon (Torx) or the like, which is constructed, for example, on the pin section and which can be actuated by means of a corresponding disassembly tool. In particular, an inner engagement means for a disassembly tool can extend through the pin section as far as the pin head. In this way, disassembly is possible by way of this engagement even when the pin section has been removed after assembly. Alternatively or additionally, the engagement means may be constructed on the end of the pin head facing away from the pin section. The engagement means may be, for example, engagement channels in which a suitable disassembly tool engages. The engagement channels may extend, for example, in an axial direction of the pin head so that they can transmit a torque exerted by a disassembly tool.

According to another embodiment, the stop means may comprise means for establishing a force fit and/or a form fit between the pin head and the sleeve section. In this regard, there may also be provision for the stop means to comprise at least one locking recess formed on the pin head and at least one locking projection formed on the sleeve head, wherein, in the course of the introduction of the pin head into the sleeve head, the at least one locking projection comes into engagement with the at least one locking recess and thus forms the stop. It is also possible for the stop means to comprise at least one locking recess formed on the sleeve head and at least one locking projection formed on the pin head, wherein, in the course of the introduction of the pin head into the sleeve head, the at least one locking projection comes into engagement with the at least one locking recess and thus forms the stop. Furthermore, the at least one locking recess may be at least one locking groove which extends in the peripheral direction of the pin head or the sleeve head.

There may be provided at least two, in particular more than two, locking projections. In the course of the introduction of the fastening pin into the fastening bushing, they come into engagement with the at least one locking recess. A force fit is thereby brought about between the fastening pin and the fastening bushing. The pin head thereby in turn carries the sleeve section with it during the subsequent further insertion into the fastening bushing and deforms the sleeve section and the sheath. This force fit advantageously also results in the fastening bushing and the sheath becoming at least partially unfolded again during the disassembly. The fastening device can thereby be removed again from the components in one piece and without being damaged, for example for maintenance or repair.

According to another embodiment, the fastening pin may have a predetermined breaking point, at which the pin section can be separated from the pin head when the device is in the fastened state. In particular, the portion of the fastening pin that projects from the components after they have been fastened can be sheared off in a particularly simple manner in this embodiment, such that the structural size of the completely assembled device is further reduced. The shearing or breaking of the pin section can be carried out with the tool used to assemble the device. Such a tool may be, for example, a rivet gun or riveting tongs.

Figure 2:
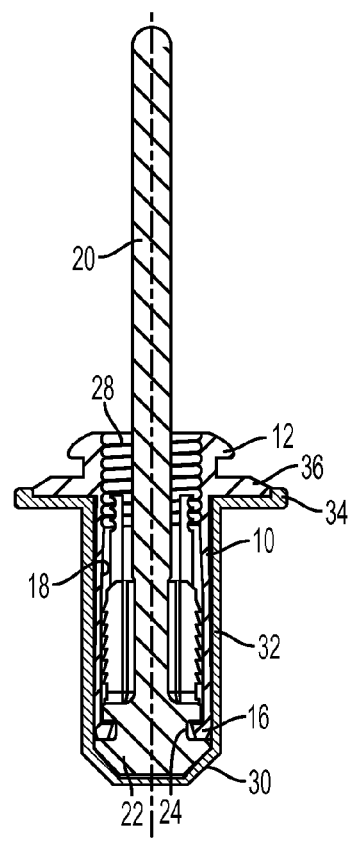
Figure 3:
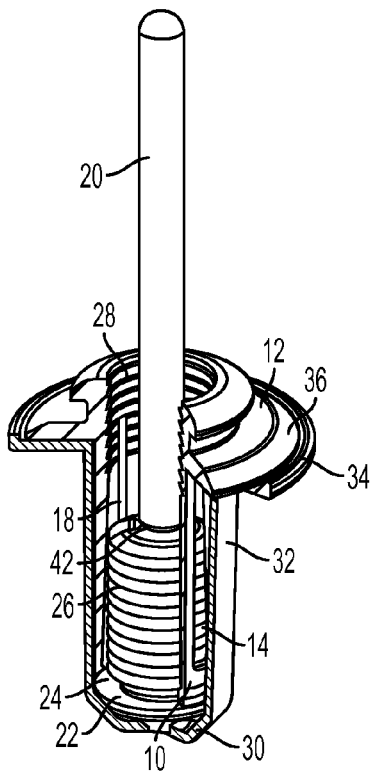
Figure 4:
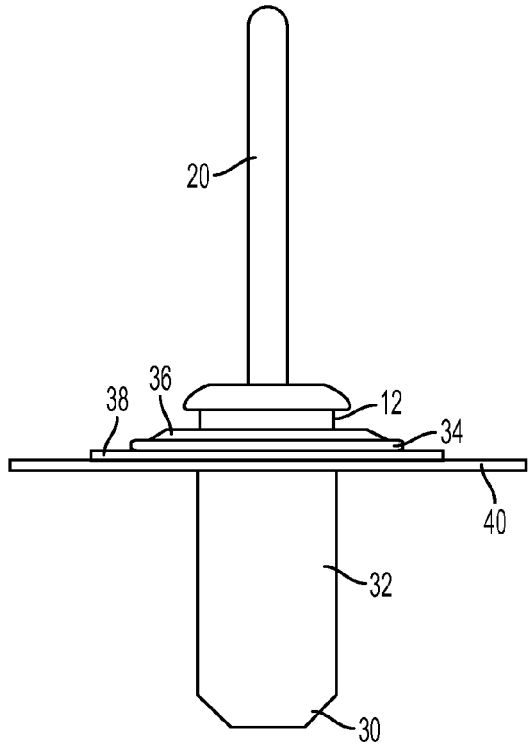
Figure 5:
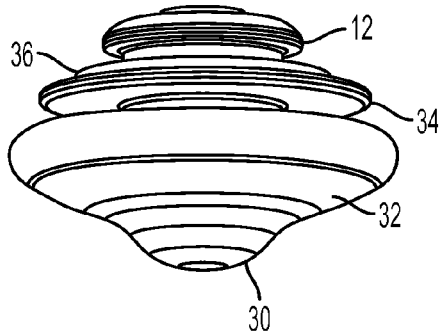
Figure 6:
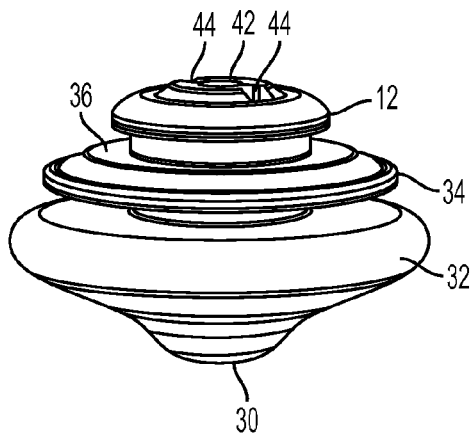
Figure 7:
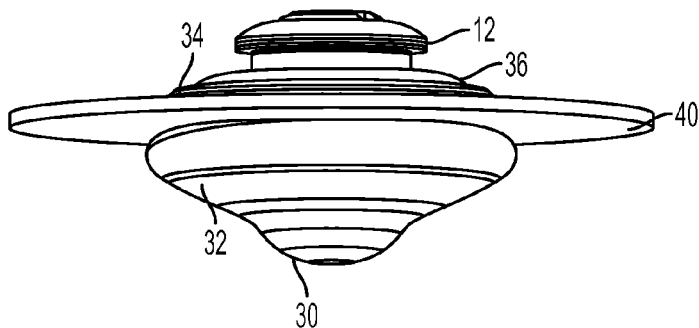
Figure 8:
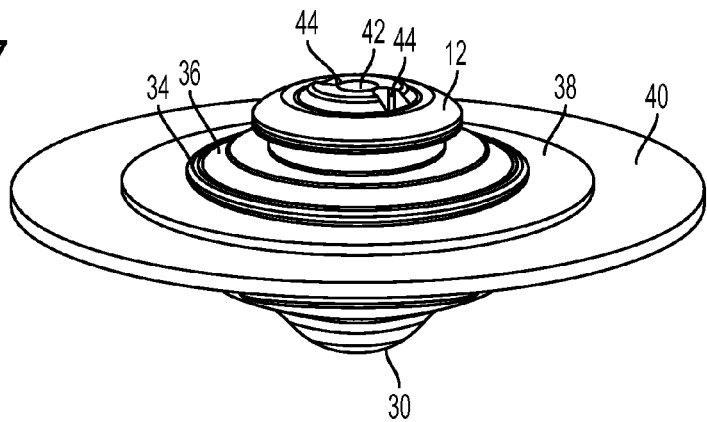
Figure 9:
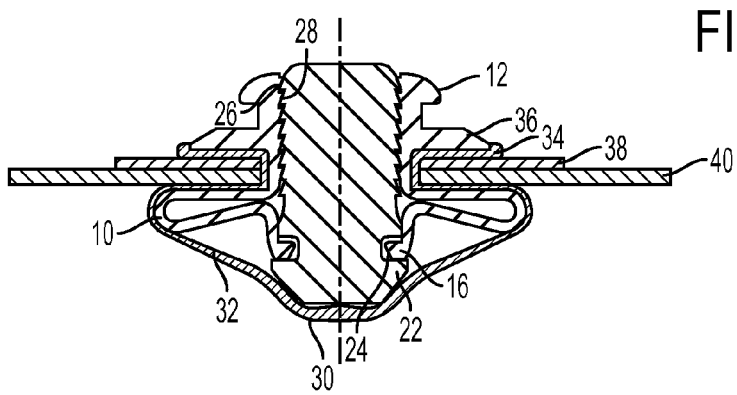

An embodiment of the invention is explained in greater detail below with reference to schematic figures, in which:

FIG. 1 is a side view of a fastening device according to the invention in a pre-assembly state, FIG. 2 is a cross-sectional view of the device from FIG. 1, FIG. 3 is a perspective, partially sectioned view of the device from FIG. 1, FIG. 4 is a side view of the device from FIG. 1 in a further pre-assembled state, FIG. 5 is a first perspective view of the device from FIG. 1 in the completely assembled state, FIG. 6 is a second perspective view of the device from FIG. 5, FIG. 7 is a perspective view of the device from FIG. 5 in the state completely assembled on two components, FIG. 8 is another perspective view of the device from FIG. 7, and FIG. 9 is a cross-sectional view of the device from FIG. 7.

Unless otherwise indicated, the same reference numerals in the figures refer to the same objects. FIGS. 1 to 3 illustrate a fastening device according to the invention in a pre-assembly state. The fastening device comprises a fastening bushing having a cylindrical sleeve section 10 and a sleeve head 12. The sleeve section 10 has, in the example shown, a plurality of axial recesses, one of which is shown in FIG. 3 and designated 14. In the region of the free end thereof facing away from the sleeve head 12, the sleeve section 10 has a peripheral locking projection 16. A through-opening 18 extends through the sleeve head 12 and the sleeve section 10. The device further comprises a fastening pin having a cylindrical pin section 20 and a pin head 22. As may be seen, for example, in FIG. 2, the fastening pin has been inserted through the through-opening 18 of the fastening bushing from below in FIG. 2. The pin head 22 has a peripheral locking groove 24 which corresponds to the locking projection 16 of the sleeve section 10. In the pre-assembled state of the device shown in FIGS. 1 to 3, the locking groove 24 and the locking projection 16 are engaged with each other and thus form a stop. It is apparent in particular in the perspective, partially sectioned view in FIG. 3 that the fastening pin also has, between the pin section 20 and the pin head 22, a locking section 26, in this instance in the form of an outer thread. The through-opening formed by the fastening bushing has, in the region of the fastening head 12, a corresponding inner thread 28 acting as a locking section.

The fastening device further comprises a water-tight sheath 30 which comprises a cylindrical section 32 and a flange 34 which adjoins the cylindrical section 32. The cylindrical section 32 is open at one side, that is to say in the region of the flange 34. As can be seen in FIGS. 1 to 3, the sheath 30 is fitted on the sleeve section 10 with the pin head 22 which is engaged therewith. The flange 34 is retained on a flange-like section 36 of the sleeve head 12. The sheath 30 thereby surrounds in a water-tight manner the sleeve section 10 and the pin head 22 which is engaged therewith. In the example shown, the fastening bushing, the fastening pin and the water-tight sheath 30 are each produced integrally in a plastics injection molding method. The sheath 30 may, for example, comprise a vulcanized thermoplastic elastomer material.

In the pre-assembly state shown in FIGS. 1 to 3, the fastening device is inserted with the sleeve section 10 surrounded by the sheath 30 through a respective through-opening of two components which are intended to be connected to each other. This state is shown in FIG. 4. The first component which is shown as a cutout at the reference numeral 38 may be, for example, a planar cladding member which is intended to be fastened on a second component, for example a bodywork component of a car, which is shown as a cutout at the reference numeral 40. To this end, in the state shown in FIG. 4, the fastening pin 20 is drawn upwards in FIG. 4 with a suitable tool, for example a rivet gun or riveting tongs. The pin head 22 carries the sleeve section 10 with it by means of the stop means formed by the locking projection 16 and the locking groove 24, wherein the sleeve section 10 is spread in an axial direction with a substantial reduction in length, as may be seen, for example, in FIG. 9. In the course of this operation, the inner thread 28 of the sleeve head 12 engages with the outer thread 26 of the fastening pin so that the device cannot become disengaged again by itself. It should further be mentioned that there is provided, between the pin section 20 and the locking section provided with the outer thread 26, a predetermined breaking point 42 at which the pin section 20 can be sheared off after the outer thread 26 and the inner thread 28 have engaged. This state is shown in FIGS. 5 to 9, the components 38, 40 not being shown in FIGS. 5 and 6 for reasons of clarity.

It can be seen in FIGS. 5 to 9 that the sheath 30 is also spread, caused by the spreading of the sleeve section 10. It experiences substantial expansion but the sheath 30 does not become torn or otherwise have its sealing function damaged. The sealing function of the sheath 30 can be clearly seen with reference to FIG. 9. As can be seen therein, the flange 34 of the sheath 30 is clamped, in this completely assembled state of the device, between the lower side of the sleeve head 12, in particular the lower side of the flange-like section 36 of the sleeve head 12, on the one hand, and the upper side of the first component 38, on the other hand. Furthermore, it may be seen that an upper portion of the cylindrical section 32 of the sheath 30 is clamped between the spread sleeve section 10 and the lower side of the second component 40. In this way, the sheath ensures sealing with respect to the passage of water from the side of the first component 38 toward the side of the second component 40, on the one hand, or from the side of the second component 40 toward the side of the first component 38, on the other hand.

It should further be mentioned that engaging means 44, in this instance engaging grooves 44, are provided in the region of the locking section of the fastening pin which is provided with the outer thread 26 and which projects upward in the state in FIGS. 5 to 9. A suitable disassembly tool (not shown) can engage in these engaging means 44 in order to unscrew the remaining portion of the fastening pin from the inner thread 26 of the pin head 12 again and thus allow destruction-free disassembly of the device. During the unscrewing operation, there is again brought about an at least partial return of the sleeve section 10 and the sheath 30 to the initial state thereof shown in FIGS. 1 to 4.

The invention claimed is:

1. Device for fastening at least a first component having a through opening on at least a second component also having a through opening, comprising a fastening bushing with a sleeve section which is designed to be inserted through the through openings of the components and with a sleeve head, wherein the sleeve section comprises at least one locking section and at least two recesses extending in an axial direction in its wall, and wherein the sleeve head comprises a through opening aligned with the sleeve section, a fastening pin with a pin section and with a pin head, wherein the pin head comprises at least one locking section, and wherein stop means are provided between the fastening pin and the fastening bushing, wherein the pin section is inserted through the sleeve section and the through opening of the sleeve head until reaching the stop provided by the stop means, wherein the pin head engages with the free end of the sleeve section being opposite to the sleeve head, a water-tight sheath, which surrounds the sleeve section and the pin head engaging the sleeve section, wherein the fastening pin is designed to be pulled further through the through opening of the sleeve head until the locking section of the pin head locks with the locking section of the sleeve section, and wherein the walls of the sleeve section and the sheath spread whereby the sleeve section and the sheath reduce in length.

2. Device according to claim 1, wherein the sheath comprises a cylindrical section being open on one side and surrounding the sleeve section and the pin head engaging the sleeve section, and a flange formed in the area of the opening of the cylindrical section.

3. Device according to claim 2, wherein the flange is held on the sleeve head.

4. Device according to claim 3, wherein the flange is held on the sleeve head via a locking connection.

5. Device according to claim 2, wherein the flange is sealingly clamped between the sleeve head and the surface of the first component when the device is fastened on the components.

6. Device according to claim 2, wherein the spread cylindrical section of the sheath sealingly abuts on the surface of the second component when the device is fastened on the components.

7. Device according to claim 1, wherein, in the course of the spreading, the sleeve section and the sheath are subjected to a cross-sectional enlargement of over 100%, in particular of over 150%, of their cross section before the spreading.

8. Device according to claim 1, wherein the cross-sectional enlargement of the sheath in the course of the spreading is proportional to its reduction in length.

9. Device according to claim 1, wherein the sheath is integrally formed.

10. Device according to claim 1, wherein the sheath consists of a thermoplastic elastomer.

11. Device according to claim 1, wherein at least one of the locking sections is provided as a thread and engagement means are provided, with which the pin head can be screwed out of the sleeve section for disassembly.

12. Device according to claim 11, wherein the engagement means are provided on the pin head and/or on the pin section.

13. Device according to claim 1, wherein the stop means comprise means for establishing a force fit and/or a form fit between the pin head and the sleeve section.

14. Device according to claim 1, wherein the fastening pin comprises a predetermined breaking point, on which the pin section can be separated from the pin head when the device is fastened on the components.

* * * * *